US012600053B2

(12) United States Patent
Li

(10) Patent No.: US 12,600,053 B2
(45) Date of Patent: Apr. 14, 2026

(54) CUTTING TOOL

(71) Applicants: HANGZHOU UNITED TOOLS CO., LTD., Hangzhou City (CN); HANGZHOU GREAT STAR INDUSTRIAL CO., LTD., Hangzhou City (CN)

(72) Inventor: Yueming Li, Hangzhou City (CN)

(73) Assignees: HANGZHOU UNITED TOOLS CO., LTD., Hangzhou City (CN); HANGZHOU GREAT STAR INDUSTRIAL CO., LTD., Hangzhou City (CN)

( * ) Notice: Subject to any disclaimer, the term of this patent is extended or adjusted under 35 U.S.C. 154(b) by 179 days.

(21) Appl. No.: 18/150,583

(22) Filed: Jan. 5, 2023

(65) Prior Publication Data

US 2023/0142660 A1 May 11, 2023

Related U.S. Application Data

(63) Continuation-in-part of application No. PCT/CN2020/100849, filed on Jul. 8, 2020.

(51) Int. Cl.
*B26D 1/30* (2006.01)
*B26D 5/10* (2006.01)

(52) U.S. Cl.
CPC ............... *B26D 1/305* (2013.01); *B26D 5/10* (2013.01)

(58) Field of Classification Search
CPC . B26D 4/10; B26D 1/305; B26D 1/30; B26D 5/10; B02C 1/02
See application file for complete search history.

(56) References Cited

U.S. PATENT DOCUMENTS

| | | | | |
|---|---|---|---|---|
| 2,641,845 | A * | 6/1953 | Gundlach | B23D 33/10 33/430 |
| 2004/0089126 | A1 | 5/2004 | McLean et al. | |
| 2009/0151532 | A1* | 6/2009 | Liu | B26F 1/02 83/618 |
| 2019/0001512 | A1 | 1/2019 | | |

FOREIGN PATENT DOCUMENTS

| | | |
|---|---|---|
| CN | 102431051A | 5/2012 |
| CN | 202825943U | 3/2013 |

(Continued)

OTHER PUBLICATIONS

International Search Report and Written Opinion from Application No. PCT/CN2020/100849; mailed Mar. 30, 2021; 14 pages.

(Continued)

*Primary Examiner* — Liang Dong
(74) *Attorney, Agent, or Firm* — Fitch, Even, Tabin & Flannery LLP

(57) ABSTRACT

A cutting tool includes a bearing member, a first cutting member, a second cutting member, a manipulation member, an avoidance part and a measuring member. The first cutting member is fixedly disposed on one side of the bearing member. The second cutting member is pivotable about a first axle provided on the bearing member, and the manipulation member is pivotable about a second axle provided on the bearing member. The manipulation member and the second cutting member make up an effort-saving lever, in which the manipulation member drives the second cutting member to move.

15 Claims, 6 Drawing Sheets

(56) References Cited

FOREIGN PATENT DOCUMENTS

| | | | | |
|---|---|---|---|---|
| CN | 208246926 | U | 12/2018 | |
| CN | 209018905 | U | 6/2019 | |
| CN | 209319884 | U | 8/2019 | |
| CN | 305645905 | S | 3/2020 | |
| CN | 210525238 | U | 5/2020 | |
| CN | 212265960 | U | 1/2021 | |
| EP | 3100834 | A1 | 7/2016 | |
| WO | WO-2016055081 | A1 * | 4/2016 | ............. B26D 1/305 |
| WO | 2022006773 | A1 | 1/2022 | |

OTHER PUBLICATIONS

CNIPA; Decision of Rejection from Application No. CN 202010651874.9; mailed Dec. 11, 2025; in Chinese with English Translation.

* cited by examiner

CUTTING TOOL

CROSS-REFERENCE TO RELATED APPLICATION

This application is a continuation-in-part (CIP) application of International Application No. PCT/CN2020/100849, filed on Jul. 8, 2020, the disclosure of which is incorporated herein in its entirety by reference.

FIELD OF THE INVENTION

The present invention relates to the field of board cutting and, in particular, to a cutting tool.

DESCRIPTION OF THE PRIOR ART

In our daily lives, cutting tools refer to a collection of tools using blades. Thin solid materials often need to be cut and trimmed to meet the requirements of various uses. In particular, in the fields of construction and decoration, it is a very common need to cut and trim thin wooden or plastic polymer materials such as flooring boards and wall tiles into suitable shapes and sizes so that they can be placed at edge, corner or other locations of buildings in need of the shapes. Differing from thin materials like paper and cloth, thin wooden or plastic polymer materials used for construction and decoration, such as flooring boards and wall tiles, are relatively strong, making their cutting and trimming require the application of strong pressure.

In the prior art, in order to achieve the purpose of cutting a wood board or a polymer material board, the tool used must provide a sufficiently large cutting force. To meet this requirement, cutting tools used in the prior art are associated with the problems of large sizes and heavy weights. In order to provide sufficient power, some cutting tools utilize electric, pneumatic and other external power, but this itself would increase structural complexity and cost of these cutting tools, making their application scenarios limited by site conditions. The cutting tools in the prior art are also associated with the problems of tending to cause cracking and damage to material edges.

Therefore, those skilled in the art are directing their effort toward developing a cutting tool, which can provide a cutting force sufficient to cut a wood board or a plastic polymer board simply by manpower without needing to resort to any external power and is thus simple in structure, easy to carry and low in cost. Additionally, this cutting tool can cut a material in a predictable and linear manner without causing cracking of the material during cutting.

SUMMARY OF THE INVENTION

In view of the above described shortcomings of the prior art, the problem sought to be solved by the present invention lies in how to, through structural design, provide a sufficiently large cutting force simply by manpower and to ensure that cracking will not occur to a material that is being cut.

In order to solve the above problem, the present invention provides a cutting tool comprising a bearing member, a first cutting member and a second cutting member, characterized in the first cutting member being fixedly coupled to the bearing member, the bearing member being provided thereon with a first axle, the second cutting member being pivotably coupled to the bearing member by the first axle.

Additionally, a manipulation member is further included, which is coupled to the second cutting member. The manipulation member is configured to drive the second cutting member to pivot about the first axle.

Additionally, the bearing member is provided thereon with a second axle, and the manipulation member is pivotably coupled to the bearing member by the second axle.

Additionally, an avoidance part is further include, which is configured to avoid the manipulation member from contact with a material to be cut during cutting.

Additionally, the avoidance part is a raised blade edge provided on the second cutting member.

Additionally, the raised blade edge is provided on an end of the second cutting member away from the first axle.

Additionally, the avoidance part is a notch provided in the manipulation member

Additionally, the manipulation member is provided with an opening, and the second cutting member is fixedly provided thereon with a connecting pin. The connecting pin is inserted in the opening to couple the manipulation member to the second cutting member.

Additionally, the manipulation member is elongate in shape, and the opening is also elongate in shape. The elongate opening is arranged along a lengthwise direction of the manipulation member.

Additionally, the opening is provided at the middle of the manipulation member, and the connecting pin is provided at the middle of the second cutting member.

Additionally, the bearing member is provided thereon with a first connecting seat, in which the first axle is provided.

Additionally, the bearing member is provided thereon with a second connecting seat, in which the second axle is provided.

Additionally, the second cutting member is elongate in shape.

Additionally, a blade edge of the second cutting member is curved.

Additionally, the blade edge of the second cutting member defines a curved line concave toward a blade back of the second cutting member.

Additionally, the second cutting member has a width greater at an end thereof close to the first axle than at an end thereof away from the first axle.

Additionally, a grip member is further included, which is a trapezoidal opening provided in the bearing member.

Additionally, the manipulation member is provided thereon with a handle. The handle is disposed on an end of the manipulation member away from the second axle.

Additionally, the manipulation member is provided thereon with a locking fastener, and a securing member projects from a side face of the second cutting member. The locking fastener is configured to be able to lock the securing member to secure the manipulation member relative to the second cutting member.

Additionally, the bearing member is provided thereon with a measuring member.

Compared with the prior art, the present invention has at least the following benefits:

1. The product is simple in structure and does not need an external pneumatic or electric source. Therefore, it can be used in a wide range of application scenarios and is not limited by site resources. Moreover, as the product is simple in structure, it is lightweight and easy to carry.
2. It is unnecessary to design a supporting power structure for an external power source. Therefore, the cost is low.

3. The present application provides an avoidance part, which can prevent breakage of a material, reduce loss of the material and improve operating efficiency.

Below, the concept, structural details and resulting technical effects of the present invention will be further described with reference to the accompanying drawings to provide a full understanding of the objects, features and effects of the invention.

DETAILED DESCRIPTION OF THE PREFERRED EMBODIMENTS

Figure 1:
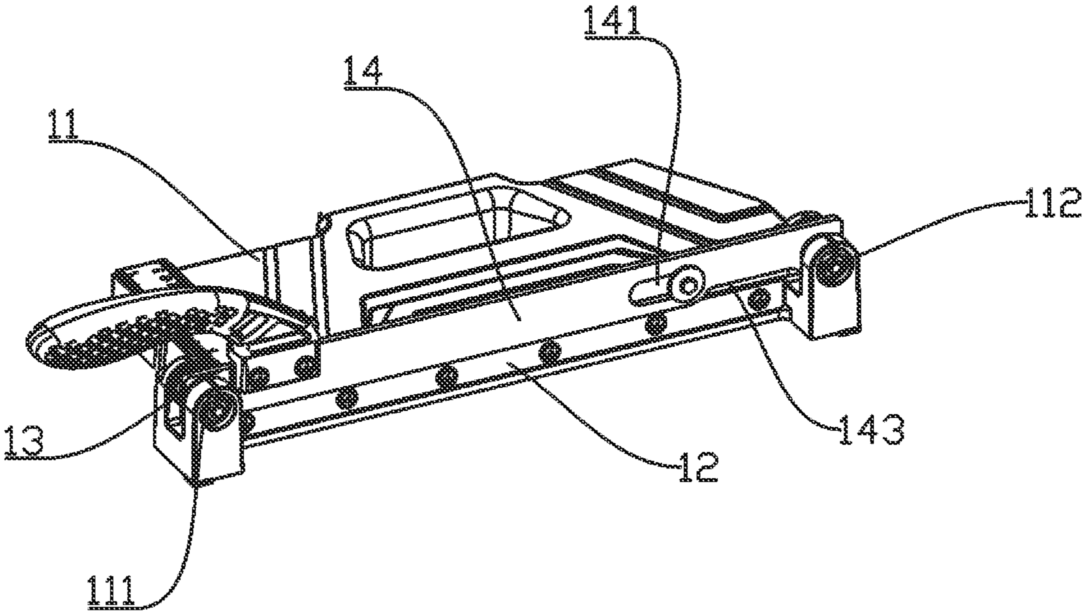
FIG. 1 schematically illustrates a folded configuration of one embodiment of the present invention.

Below, the drawings accompanying this specification are referenced to introduce many preferred embodiments of the present invention so that the techniques disclosed herein become more apparent and better understood. The present invention may be embodied in many different forms of embodiment, and its protection scope is not limited only to the embodiments mentioned herein.

Throughout the accompanying drawings, structurally identical parts are indicated with identical reference numerals, and structurally or functionally similar components are indicated with similar reference numerals. The size and thickness of each element in the drawings are arbitrarily depicted, and the present invention is not limited to any size or thickness of each element. For greater clarity of illustration, the thicknesses of some parts are exaggerated as appropriate somewhere in the drawings.

Embodiment 1

Figure 2:
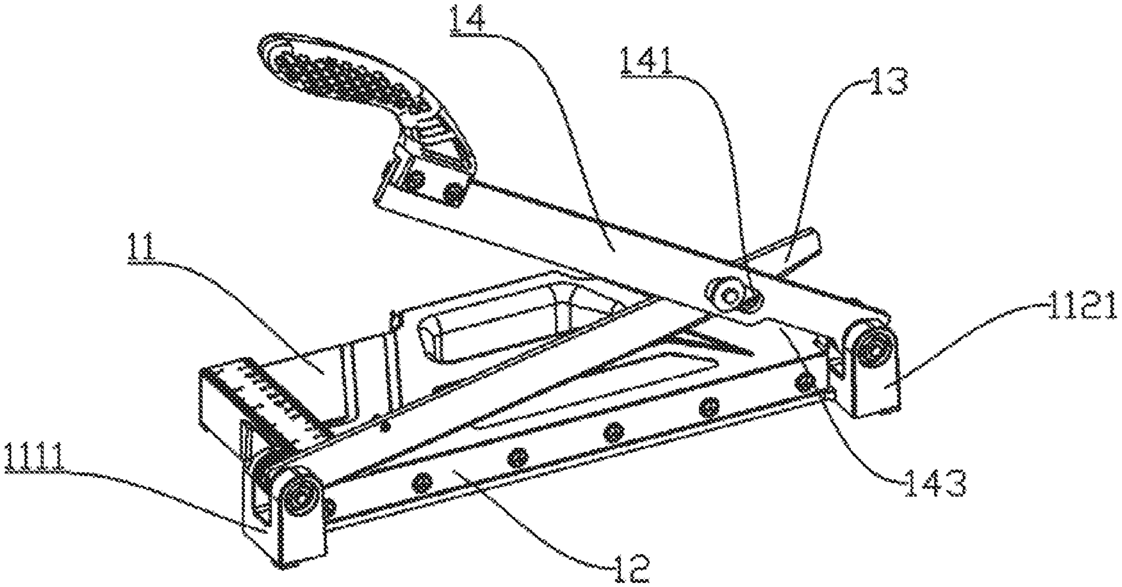
FIG. 2 schematically illustrates an unfolded configuration of one embodiment of the present invention.
Figure 3:
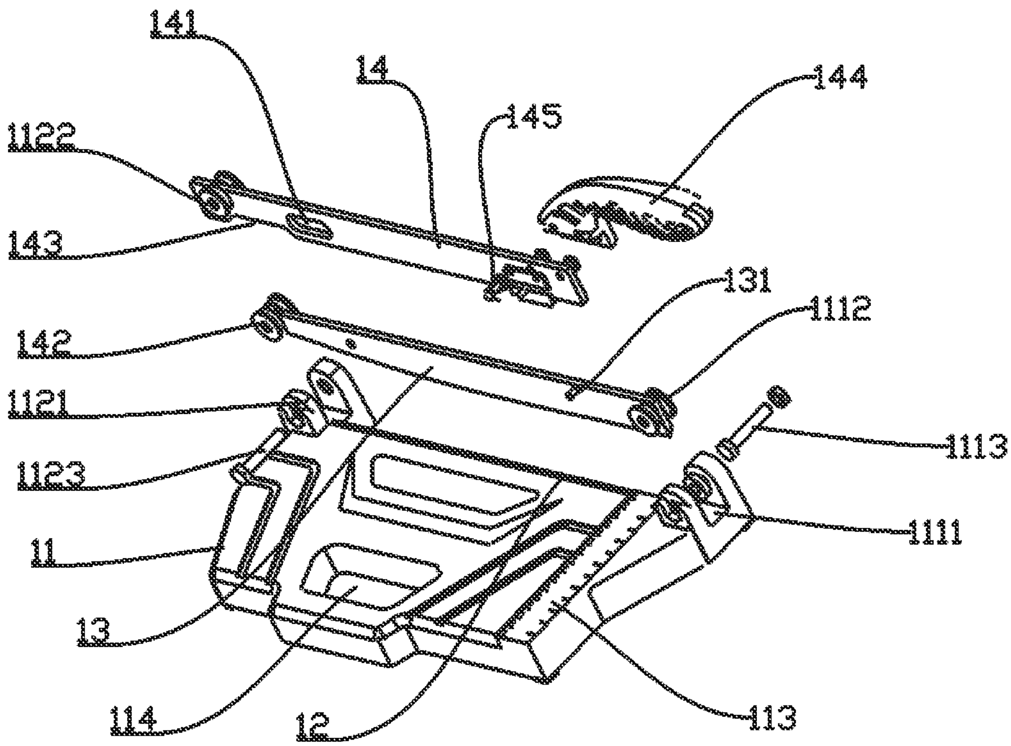
FIG. 3 is a schematic exploded view of one embodiment of the present invention.

FIGS. 1 to 3 show one embodiment of the present invention. It includes a bearing member 11, which is a base of the present invention for placement thereon of various components and for bearing a material to be cut. This embodiment produces, by engagement of a first cutting member 12 with a second cutting member 13, a shearing force for cutting a board. Wherein, the first cutting member 12 is elongate in shape and fixedly disposed on a side face of the bearing member 11, and the second cutting member 13 is movable relative to the bearing member. During movement of the second cutting member 13, a blade edge of the second cutting member 13 comes into engagement with a blade edge of the first cutting member 12, thereby producing a shearing force. In addition, in order to be able to provide a larger shearing force, this embodiment further includes a manipulation member 14 for driving the second cutting member 13 to move by using the law of the lever that can save effort. Specifically, on one side of the bearing member 11, a first pivot axis point 111 and a second pivot axis point 112 are provided at opposing ends thereof. The second cutting member 13 is coupled to the bearing member 11 by a connecting means disposed at the first pivot axis point 111. The manipulation member 14 is coupled to the bearing member 11 by a connecting means disposed at the second pivot axis point 112.

The first pivot axis point 111 is provided thereat with a first holder 1111. In this embodiment, the first holder 1111 is a U-shaped holder. Axle holes are provided in both arms of the first holder 1111. The second cutting member is elongate in shape and provided at one end thereof with a first axle hole 1112. This end with the first axle hole 1112 is assembled at the first pivot axis point 111. The axle holes in the two arms of the first holder 1111 are arranged in coincidence with the first axle hole 1112 provided in the second cutting member 13. A first bolt 1113 passes through the axle holes in the two arms of the first holder 1111 and the first axle hole 1112, thereby coupling the second cutting member 13 to the bearing means 11. Coupled by the first bolt 1113, the second cutting member 13 is able to pivot about a first axle provided by the first bolt 1113.

The second pivot axis point 112 is provided thereat with a second holder 1121. In this embodiment, the second holder 1121 is a U-shaped holder. Axle holes are provided in both arms of the second holder 1121. The manipulation member 14 is elongate in shape and provided at one end thereof with a second axle hole 1122. This end with the second axle hole 1122 is assembled at the second pivot axis point 112. The axle holes in the two arms of the second holder 1121 are arranged in coincidence with the second axle hole 1122 provided in the manipulation member 14. A second bolt 1123 passes through the axle holes in the two arms of the second holder 1121 and the second axle hole 1122, thereby coupling the manipulation member 14 to the bearing means 11. Coupled by the second bolt 1123, the manipulation member 14 is able to pivot about a second axle provided by the second bolt 1123.

It is to be noted that, in other embodiments, the first holder 1111 and the second holder 1112 may not be necessarily U-shaped holders, and only one axle hole may be provided for coupling of the second cutting member 13 to the bearing member 11, or for coupling of the manipulation member 14 to the bearing member 11.

The manipulation member 14 is provided therein with a slot 141, which is elongate in shape and arranged along a lengthwise direction of the manipulation member 14. The second cutting member 13 is provided with a connecting pin. The connecting pin passes through the slot 141 and is able to move within a space defined by the slot in the lengthwise direction of the manipulation member 14, thus coupling the second cutting member 13 to the manipulation member 14. In order to facilitate the movement of the connecting pin within the slot 141, rotating wheels 142 may be provided over the connecting pin. The rotating wheels 142 are sized to match a size of the slot 141 so that the connecting pin can more smoothly move in the slot 141. When the manipulation member 14 is pivoting about the second axle at the second pivot axis point 112, by means of the coupling of the slot 141 and the connecting pin, the second cutting member 13 is driven to pivot about the first axle at the first pivot axis point 111. The manipulation member 14 is provided at its end away from the second pivot axis point 112 with a handle 144. In use of this embodiment for cutting, a user applies an upward external force to the handle 144 (as used herein, the terms "upward" and "downward" refer to directions opposite to and in that of the natural gravity when the bearing member 11 is placed horizontally) to cause the manipulation member 14 to pivot about the second axle at the second pivot axis point 112. Driven by the manipulation member 14, the second cutting member 13 pivots about the first axle at the first pivot axis point 111 to separate from the first cutting member 12. After a material to be cut is properly placed on the bearing member 11, a downward external force is applied to the manipulation member 14 to cause the manipulation member 14 and the second cutting member 13 to pivot in directions opposite to those in the previous step so that the blade edge of the second cutting member 13 gradually comes into engagement with the first cutting member 12 to start a cutting action. Finally, the blade edge of the second cutting member 13 fully engages with the first cutting member 12, thereby completing the cutting action.

Since the second cutting member 13 produces a shearing force at the location where the blade edge of the second cutting member 13 contacts the material to be cut while the manipulation member 14 acts on the second cutting member 13 at the rotating wheels 142, as long as the rotating wheels 142 are disposed away from the first pivot axis point 111, an effort-saving lever can be provided. The farther away from the first pivot axis point 111 the rotating wheels 142 are disposed, the more effort the effort-saving lever can save. The user acts on the handle 144, while the second cutting member 13 acts on the manipulation member 14 at the slot 141. Since the handle 144 is provided at the end of the manipulation member 14 away from the second pivot axis point 112 while the slot 141 is obviously less distant from the second pivot axis point 112 than the handle 144 (see FIGS. 1 to 3), another effort-saving lever is provided, and the closer the slot 141 is to the second pivot axis point 112, the more effort the effort-saving lever can save. The two effort-saving levers are combined to enable the present device to exert a sufficiently large shearing force on a material to be cut under manual manipulation without needing an external electric, pneumatic or other power source.

When the present device is out of use, the first cutting member 12, the second cutting member 13 and the manipulation member 14 are collocated (as shown in FIG. 1). In this embodiment, the manipulation member 14 is further provided thereon with a locking fastener 145, and the second cutting member 13 is provided with a pin 131 at a corresponding position. When the first cutting member 12, the second cutting member 13 and the manipulation member 14 are collocated, the locking fastener 145 can lock the pin 131 to secure the first cutting member 12, the second cutting member 13 and the manipulation member 14 against one another to facilitate handling, improve safety and avoid accidents.

In this embodiment, the bearing member 11 is further provided thereon with a ruler 113 having a graduated surface, which serves as a measuring member in this embodiment. The ruler 113 is fixed to and raised over a top surface of the bearing member 11. The ruler 113 is provided on the side of the bearing member 11 proximal to the first pivot axis point 11 so as to be perpendicular to the first cutting member 12. In order to facilitate the handling of this embodiment, this embodiment further includes a grip member. The grip member is disposed on the bearing means 11 on the side opposite to the first cutting member 11. Specifically, the bearing means 11 is further provided with a grip opening 114 extending through the bearing means. The grip opening 114 is substantially trapezoidal, located on the side of the bearing member 11 opposite to the first cutting member 12, and parallel to the first cutting member 12. The user can conveniently hold the present device by virtue of the grip opening 114.

Figure 4:
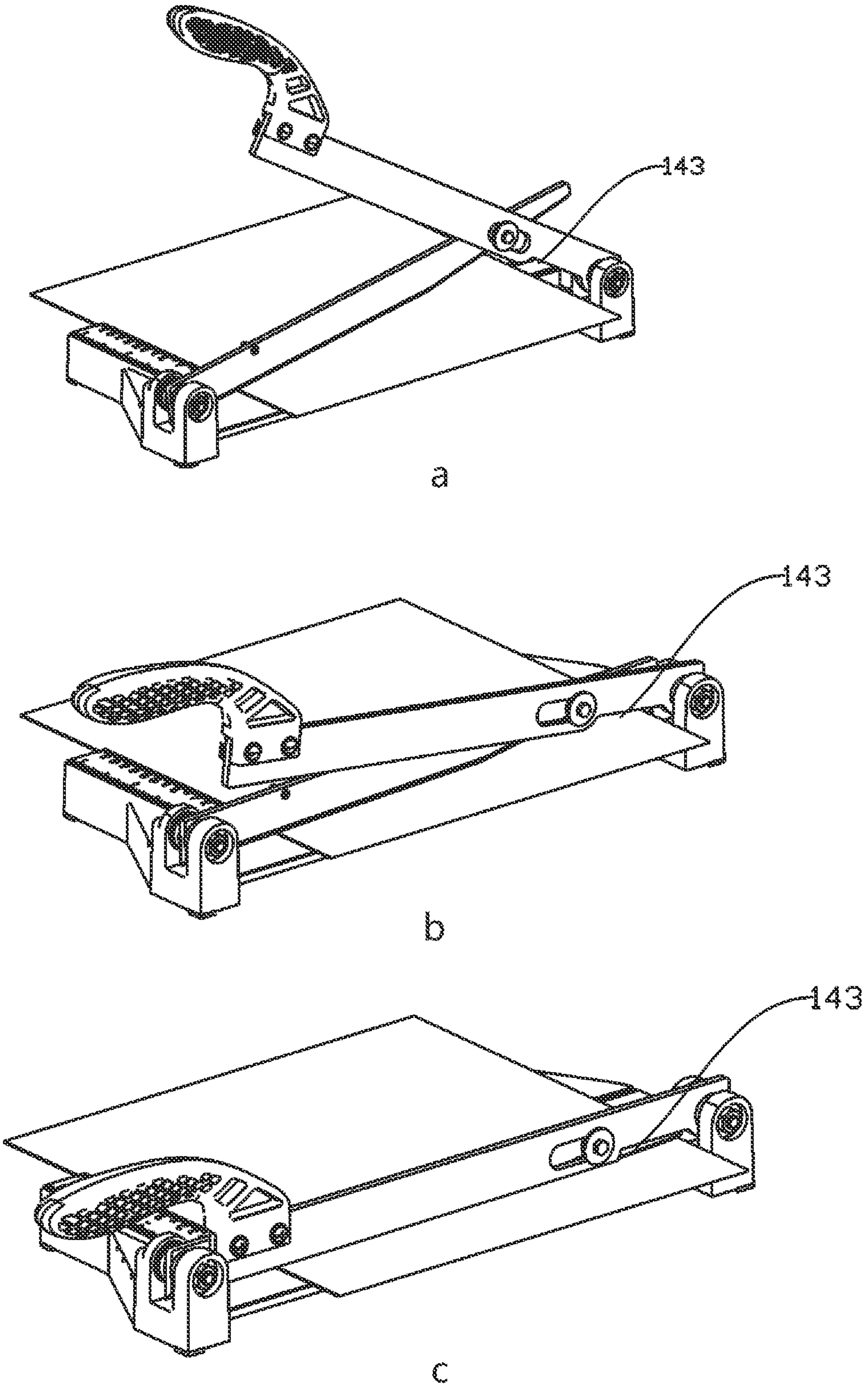
FIG. 4 schematically illustrates an effect provided by an avoidance part in one embodiment of the present invention.

FIG. 4 schematically illustrates operation of this embodiment. In this embodiment, the manipulation member 14 is further provided with an elongate notch 143 in the vicinity of the second pivot axis point 112, which serves as an avoidance part of this embodiment. Thanks to the presence of the elongate notch 143, during the performance of a cutting action by the second cutting member 13 of this embodiment in order from a to b to c as shown in FIG. 4, a portion of its blade edge away from the first pivot axis point 111 will come into contact with a material to be cut earlier than a portion of the manipulation member 14 near the second pivot axis point 112. In this way, the manipulation member 14 can be avoided from causing damage to the material to be cut. In other embodiments, the avoidance part may assume different forms while still achieving similar results.

Embodiment 2

Figure 5:
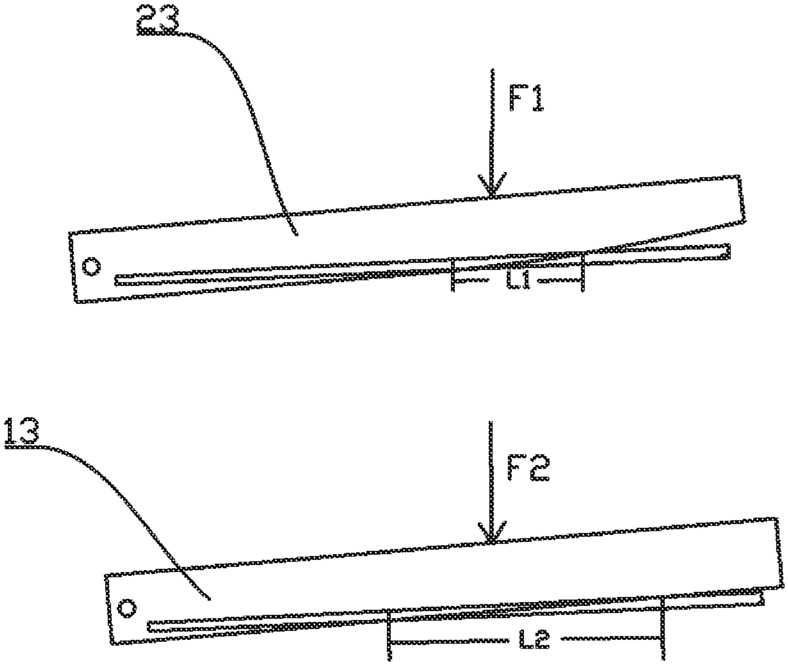
FIG. 5 schematically illustrates an effect provided by a curved blade edge in one embodiment of the present invention.

As shown in FIG. 5, this embodiment differs from Embodiment 1 in that a second cutting member 23 in Embodiment 2 has a blade edge that is curved. Specifically, the blade edge defines a curved line concave toward a blade back of the second cutting member 23. In this embodiment, the blade edge is preferably curved so that the second cutting member 23 has a large width at a location closer to the first pivot axis point 111 and a smaller width at a location farther away from the first pivot axis point 111. Using the curved blade edge can provide an effect of additionally saving effort and thereby enabling the creation of a greater shearing force by limited manpower.

FIG. 5 schematically illustrates a cutting performance comparison between the second cutting member 23 of Embodiment 2 having the curved blade edge and the second cutting member 13 of Embodiment 1 having a conventional straight blade edge. As can be seen from the figure, the second cutting member 23 of Embodiment 2 has a contact length of L1 with the material to be cut, and the second cutting member 13 of Embodiment 1 has a contact length of L2 with the material to be cut. Due to the curved blade edge, L1 is smaller than L2, leading to a lower pressure exerted by the material to be cut on the blade edge of Embodiment 2, as compared with Embodiment 1. This means that, for the same material to be cut, a cutting force F1 required in Embodiment 2 is smaller than a cutting force F2 required in Embodiment 1. Therefore, through providing the curved blade edge, some materials to be cut that would not have been cuttable simply by manpower because relatively great shearing forces are required can now be cut simply by manpower.

Indeed, the blade edge of the second cutting member 23 can also be configured with another curved shape concave toward the blade back than that of this embodiment, because similar results can be achieved as long as a shorter contact length is attainable between the blade edge and the material to be cut.

Embodiment 3

Figure 6:
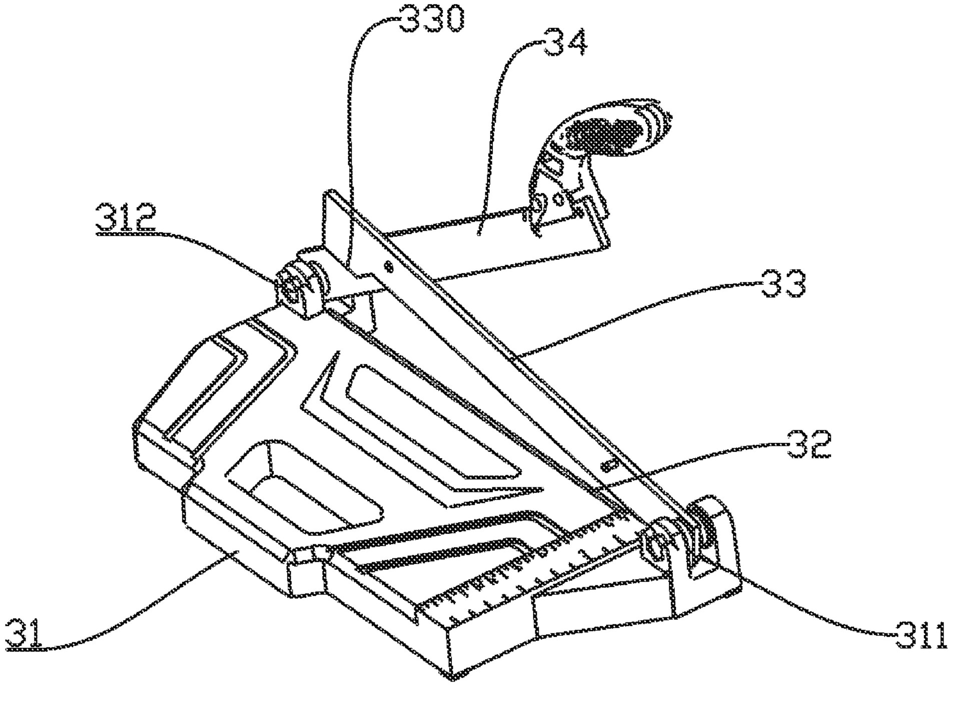
FIG. 6 is a schematic structural overview of one embodiment of the present invention.
Figure 7:
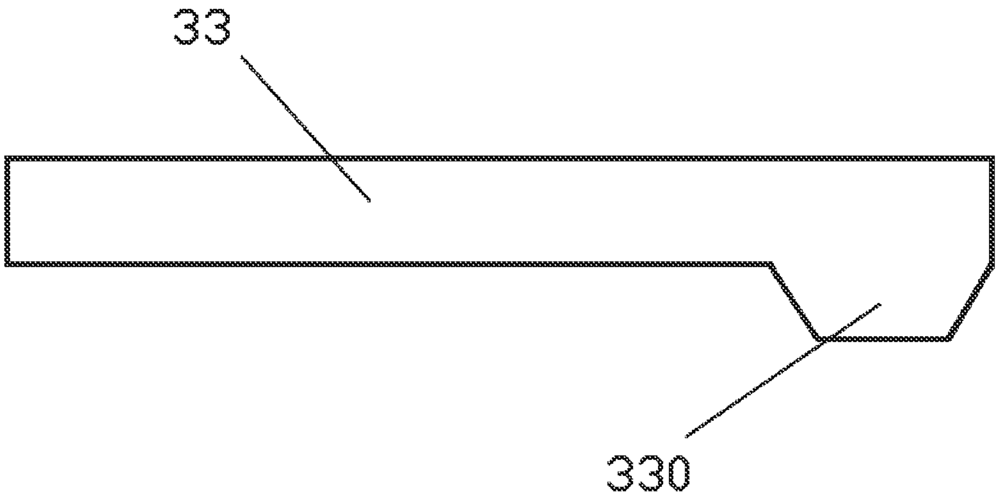
FIG. 7 is a schematic diagram illustrating the structure of a raised blade edge in one embodiment of the present invention.

FIGS. 6 to 7 show another embodiment of the present invention. Similar to Embodiment 1, a first cutting member 32 is provided at a side face of a bearing member 31, and a first pivot axis point 311 and a second pivot axis point 312 are provided at a top surface of the bearing member 31. A second cutting member 33 is coupled to the bearing member 31 through a first axle provided at the first pivot axis point 311 so as to be able to pivot about the first axle. A manipulation member 34 is coupled to the bearing member 31 through a second axle provided at the second pivot axis point 312 so as to be able to pivot about the second axle. The manipulation member 34 is coupled to the second cutting member 33 so as to be able to drive the second cutting member to move.

Differing from Embodiment 1, in this embodiment, instead of an elongate notch in the manipulation member 34, a raised blade edge 330 is provided in the second cutting member 33 as an avoidance part of this embodiment. Thanks to the presence of the raised blade edge 330, even when there is no notch in the manipulation member 34, it can still be ensured that the second cutting member 33 comes into contact with a material to be cut earlier than the manipulation member 34 at any position, thereby protecting the material to be cut against any damage that may be caused by the manipulation member 34.

Embodiment 4

Figure 8:
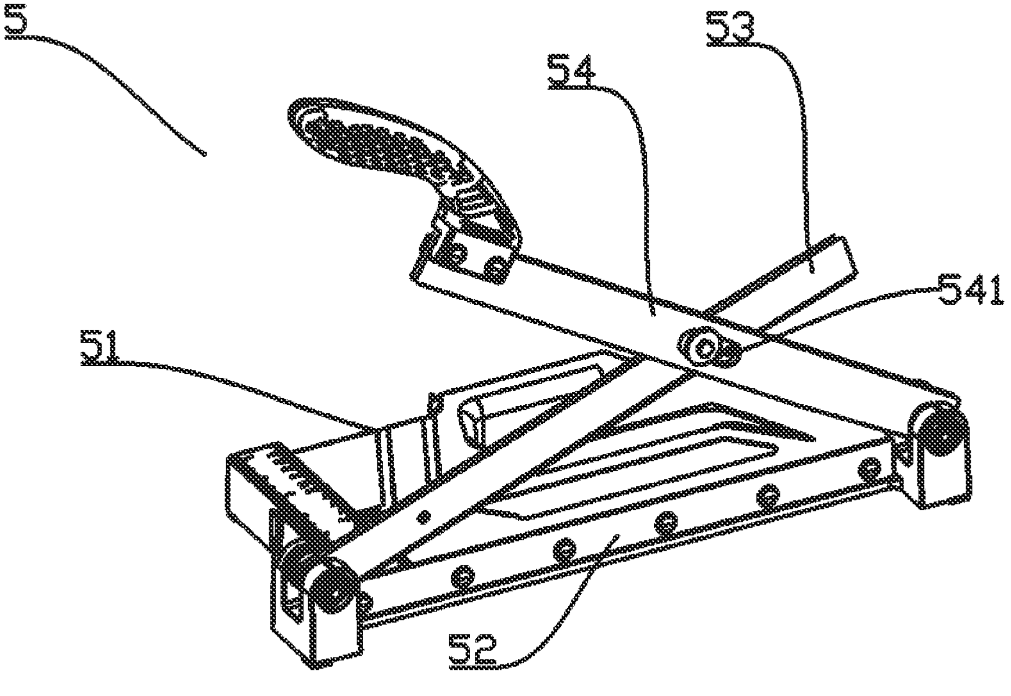
FIG. 8 is a schematic structural overview of one embodiment of the present invention, in which, 11 denotes a bearing member; 111, a first pivot axis point; 1111, a first holder; 1112, a first axle hole; 1113, a first bolt; 112, a second pivot axis point; 1121, a second holder; 1122, a second axle hole; 1123, a second bolt; 113, a ruler; 114, a grip opening; 12, a first cutting member; 13, a second cutting member; 131, a pin; 14, a manipulation member; 141, a slot; 142, a connecting pin; 143, an elongate notch; 144, a handle; 145, a locking fastener; 23, a second cutting member; 311, a first pivot axis point; 312, a second pivot axis point; 32, a first cutting member; 33, a second cutting member; 330, a raised blade edge; 34, a manipulation member; 51, a bearing member; 52, a first cutting member; 53, a second cutting member; 54, a manipulation member; and 541, a slot.

FIG. 8 shows a further embodiment of the present invention. Similar to Embodiment 1, a first cutting member 52 is provided at a side face of a bearing member 51, and a manipulation member 54 is coupled to a second cutting member 53 so as to be able to drive the second cutting member to move. Differing from the above embodiments, in this embodiment, a slot 541 that is elongate in shape is provided at the middle of the manipulation member 54. Through providing this slot 541 at said location, the same effect as with an avoidance part can be provided to similarly protect a material to be cut against any damage that may be caused by the manipulation member 54.

Further, in other embodiments, in order to additionally save effort, the second cutting member 53 may also have a curved blade edge as in Embodiment 2.

Preferred specific embodiments have been described in detail above. It is to be understood that, those of ordinary skill in the art can make various modifications and changes based on the concept of the present invention without exerting any creative effort. Accordingly, all the technical solutions that can be obtained by those skilled in the art by logical analysis, inference or limited experimentation in accordance with the concept of the present invention on the basis of the prior art are intended to fall within the protection scope as defined by the claims.

The invention claimed is:

1. A cutting tool, comprising:

a bearing member for bearing a material to be cut, wherein a first axle and a second axle are provided at opposing ends of the bearing member, a first cutting member for cutting the material to be cut, wherein the first cutting member is fixedly coupled to the bearing member, a second cutting member for cutting the material to be cut, wherein one end of the second cutting member is pivotably coupled to the bearing member by the first axle, the second cutting member is configured to be able to pivot to come into engagement with the first cutting member to produce a shearing force on the material to be cut that is placed on the bearing member, a manipulation member for driving the second cutting member to pivot, wherein one end of the manipulation member is pivotably coupled to the bearing member by the second axle, the manipulation member is provided with an opening, the second cutting member is fixedly provided thereon with a connecting pin, the connecting pin is inserted in the opening to accomplish coupling of the manipulation member and the second cutting member, thereby allowing an upward or downward external force applied to the manipulation member to drive the second cutting member to pivot about the first axle, and an avoidance part being configured to avoid the manipulation member from contact with the material to be cut during cutting;

wherein the cutting tool is configured such that when not in use at least a part of a cutting edge of the second cutting member is overlapped with at least a part of a lower edge of the manipulation member.

2. The cutting tool of claim 1, wherein the avoidance part comprises a raised blade edge provided on the second cutting member.

3. The cutting tool of claim 2, wherein the raised blade edge is provided on the second cutting member at an end away from the first axle.

4. The cutting tool of claim 1, wherein the avoidance part comprises a notch provided on the manipulation member.

5. The cutting tool of claim 1, wherein the opening is elongate in shape.

6. The cutting tool of claim 5, wherein the opening is provided at a middle of the manipulation member, and the connecting pin is provided at a middle of the second cutting member.

7. The cutting tool of claim 1, wherein the bearing member is provided thereon with a first connecting seat in which the first axle is provided.

8. The cutting tool of claim 1, wherein the bearing member is provided thereon with a second connecting seat in which the second axle is provided.

9. The cutting tool of claim 1, wherein the second cutting member is elongate in shape.

10. The cutting tool of claim 9 wherein a blade edge of the second cutting member is straight.

11. The cutting tool of claim 9, wherein a blade edge of the second cutting member is curved.

12. The cutting tool of claim 11, wherein the blade edge of the second cutting member defines a curved line concave toward a blade back of the second cutting member.

13. The cutting tool of claim 12, wherein a width of the second cutting member at an end thereof close to the first axle is greater than a width thereof at an end away from the first axle.

14. The cutting tool of claim 1, wherein the manipulation member is provided thereon with a locking fastener, the second cutting member comprises a securing member projecting from a side face of the second cutting member, and the locking fastener is configured to be able to lock the securing member to secure the manipulation member relative to the second cutting member.

15. The cutting tool of claim 1 wherein the bearing member is provided thereon with a measuring part.

* * * * *